Aug. 31, 1965 A. MINET 3,203,457
COMMINUTING APPARATUS
Filed Jan. 11, 1962 2 Sheets-Sheet 1
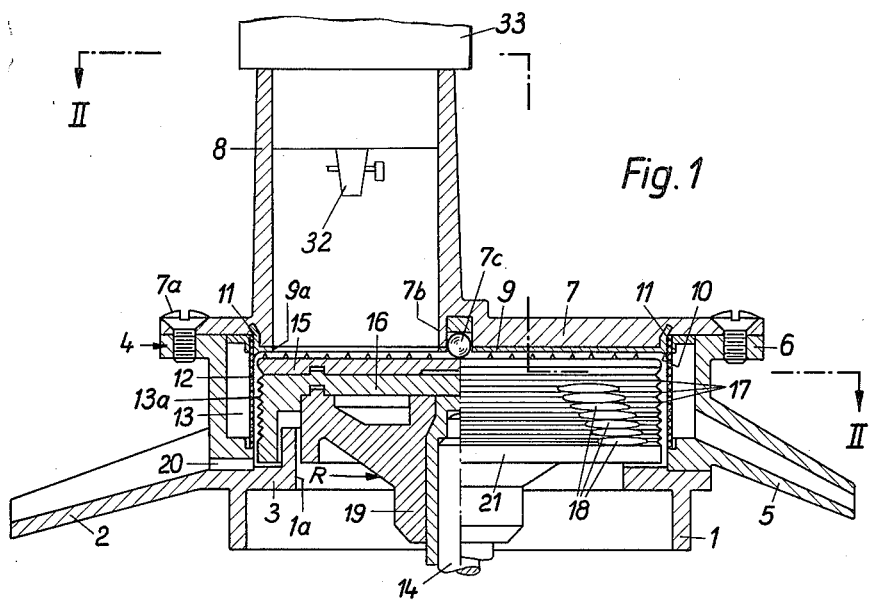
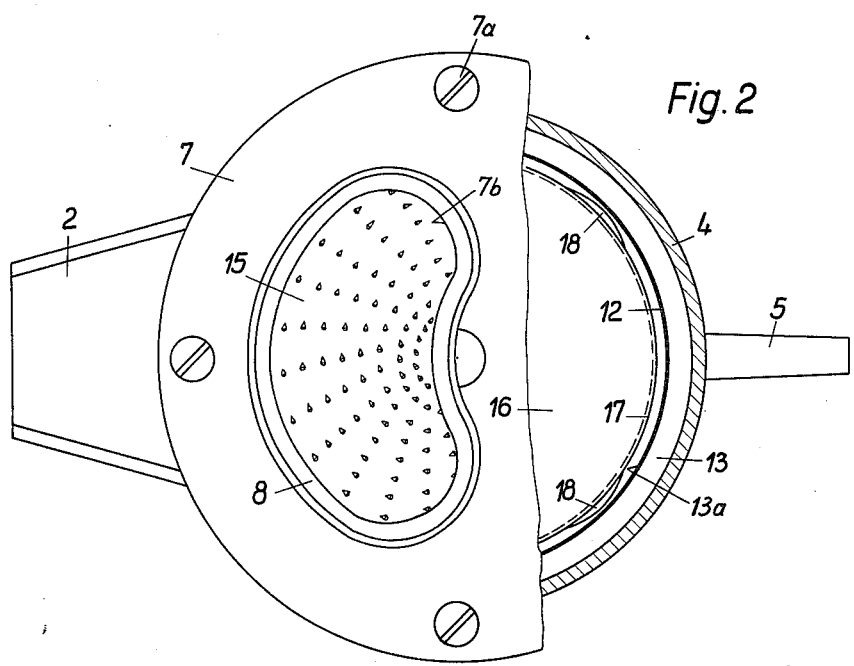
Inventor:
ALBERT MINET
BY
Michael S. Striker
his ATTORNEY

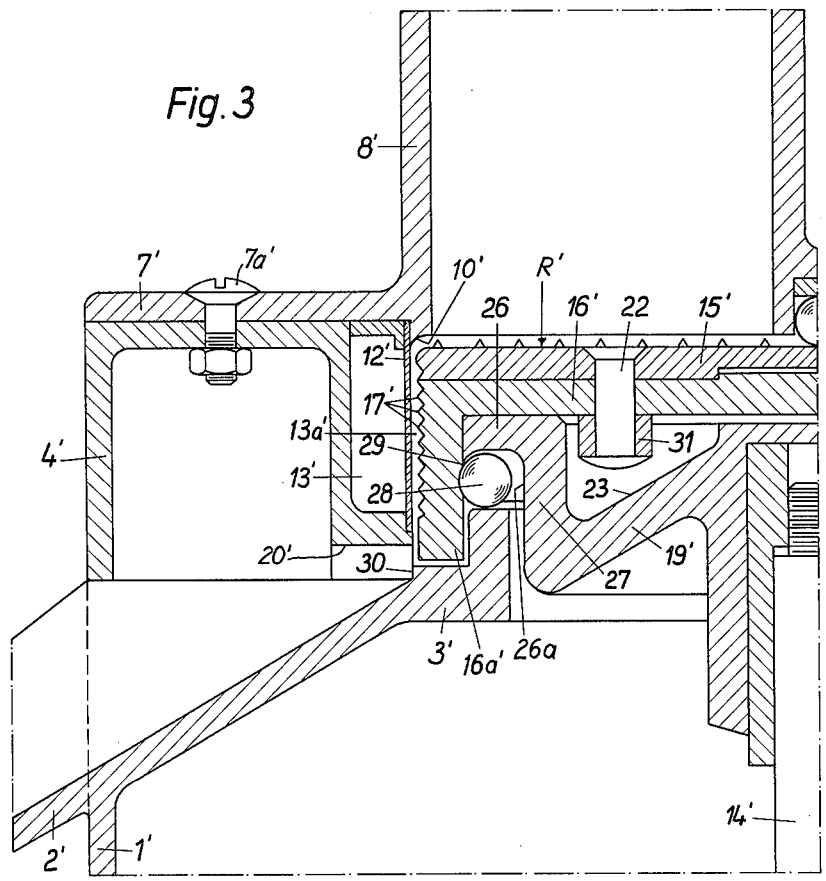

United States Patent Office 3,203,457
Patented Aug. 31, 1965

3,203,457
COMMINUTING APPARATUS
Albert Minet, Caracas, Venezuela, assignor to Braun Aktiengesellschaft, Frankfurt am Main, Germany, a corporation
Filed Jan. 11, 1962, Ser. No. 165,532
5 Claims. (Cl. 146—76)

The present invention relates to comminuting apparatus in general, and more particularly to an apparatus which in addition to pure comminuting action may perform one, two or more other functions, such as extracting liquids from comminuted fruits or vegetables, homogenizing milk, intimately mixing a comminuted solid substance with a finely dispersed liquid medium and/or any combination of the above functions.

An important object of the invention is to provide a comminuting apparatus which may be rapidly and conveniently converted for use as a juice extractor, as a homogenizer and/or as a mixer, and whose comminuting action at least equals the comminuting action of the conventional comminuting apparatus of which I am aware at this time.

Another object of the invention is to provide a combined comminuting and juice extracting apparatus which can extract a higher percentage of liquids than the extracting apparatus of conventional design and whose liquid-extracting action may be controlled within a wide range and in an extremely simple way.

A further object of the invention is to provide a combined comminuting and juice extracting apparatus which produces little noise, which can be operated by any available source of electric power, and which can be operated, assembled, dismantled and/or cleaned by persons having little technical skill and without utilization of special tools.

An additional object of the instant invention is to provide a combined comminuting and juice extracting apparatus whose relatively movable parts are automatically uncoupled when the apparatus is not in use but wherein the relatively movable parts are automatically connected with each other as soon as the user begins to operate the apparatus.

A concomitant object of the invention is to provide a comminuting apparatus which may be used in many widely different branches of the industry including chemical plants, food processing establishments such as dairies, coffee grinding plants, fruit conserving and processing factories, egg processing plants, cheese making factories and others, and which is equally useful as a universal household appliance to assist the housewife in her daily work.

Still another object of the invention is to provide a comminuting apparatus whose individual components may be assembled into two or more readily separable units to facilitate cleaning and assembling, and which may be furnished with attachmetns enabling it to alternately perform two or more widely different functions.

An additional object of the invention is to provide a comminuting apparatus of the above outlined characteristics which may be utilized for uninterrupted operation on a large scale or for intermittent operation in processing of smaller batches of starting materials.

A further object of the invention is to provide a combined comminuting and liquid extracting apparatus which embodies the advantageous features of heretofore known apparatus for similar purposes without, however, possessing the disadvantages of such known apparatus.

With the above objects in view, the invention resides in the provision of a method of finely comminuting (i.e. grinding, dispersing, crushing or pulverizing) liquid-free and/or liquid-containing substances which comprises the steps of partially comminuting and simultaneously accelerating a partially comminuted substance, and thereupon repeatedly accelerating and further comminuting the partially comminuted substance.

When the improved comminuting method is resorted to in extraction of liquids (e.g. juices) from liquid-containing substances, the liquid contents are extracted to a certain extent during partial comminution and to a certain extent during further comminution of the liquid-containing substance, and the extracted liquid component is filtered from the remainder of the substance while the substance is being repeatedly accelerated.

On the other hand, if my comminuting method is applied in mixing, e.g. in homogenizing of milk, the fat globules contained in milk are partially dispersed in a first step and are simultaneously accelerated together with the remaining contents of milk. In the next step, the partially dispersed fat globules are repeatedly accelerated and are thereby further dispersed to form an intimate mixture with the remaining contents of milk.

The apparatus for the practice of my method comprises essentially a preferably cylindrical stator, movable comminuting means preferably assuming the form of a rotor which is disposed within and which defines with the stator an annular comminuting compartment into which a partially comminuted liquid-containing or liquid-free substance is admitted either continuously or intermittently, a plurality of comminuting elements provided on the movable comminuting means and extending into the comminuting chamber toward but short of the stator for repeatedly accelerating and for simultaneously further comminuting the partially comminuted substance, and means for moving the comminuting means with respect to the stator.

The novel features which are considered as characteristic of the invention are set forth in particular in the appended claims. The invention itself, however, both as to is construction and its method of operation, together with additional objects and advantages thereof, will be best understood from the following detailed description of certain specific embodiments with reference to the accompanying drawing, in which:

FIG. 1 is a central vertical section through a comminuting apparatus which embodies one form of my invention, the apparatus being assumed to be utilized as a juice extractor and the right-hand portion of its movable comminuting means being shown in side elevational view;

FIG. 2 is a partial top plan and partial horizontal sectional view of the comminuting apparatus as seen in the direction of arrows from the line II—II of FIG. 1; and FIG. 3 is a greatly enlarged fragmentary vertical sectional view of a modified comminuting apparatus shown in the form it assumes when utilized as a mixer.

Referring now in greater detail to the illustrated embodiments, and first to FIGS. 1 and 2, there is shown a comminuting apparatus in the form it assumes when used as a juice extractor. The apparatus comprises a cylindrical supporting member or carrier 1 provided with a radially outwardly extending outlet in the form of an inclined chute 2 which serves as a means for evacuating the finely comminuted pulpy component of a fruit or a vegetable substance which is treated in the apparatus. The carrier 1 is provided with a concentric upwardly extending collar 3 of smaller diameter which serves as an internal bearing support for the downwardly extending annular flange of a comminuting means in the form of a composite rotor R, and the carrier detachably supports a substantially cylindrical housing 4 which latter is provided with an outlet in the form of a radially outwardly extending inclined spout 5 adapted to remove the extracted liquid component of a fruit or vegetable substance which is treated in the apparatus. At its open upper end, the housing 4 is provided with an outwardly extending annular flange 6 serving as a support for a cover member or lid 7 which is removably secured thereto by a series of suitably spaced threaded screws 7a or in any other suitable way. The lid 7 is provided with an intake aperture 7b surrounded by an upwardly extending tubular extension or hopper 8 which serves as a means for admitting the fruit or vegetable substance (e.g. apples, beets, carrots or the like) to the rotor R.

At the underside of the lid 7, there is provided a disk-shaped deflecting plate 9 which cooperates with a cylindrical sieve or filter-like stator 12, the latter disposed about and spaced from the rotor R. The underside of the plate 9 comprises a concave edge portion 10 which is adjacent to the inner side of the stator 12, and the plate 9 is further provided with an upwardly extending annular anchoring portion 11 which projects into and is retained in a complementary recess of the lid 7 so that the lid and the deflecting plate form a unit which is detachable from the housing 4. The plate 9 is provided with an aperture 9a which is aligned with the aperture 7b so that the material to be treated may pass through the aligned apertures 7b, 9a into engagement with the rotor R. As shown in FIG. 1, the deflecting plate 9 seals the open upper end of the stator 12, and the lower end of this stator extends into and is centered in a shallow internal annular recess of the housing 4. It is preferred to secure the stator to the deflecting plate 9 so that the stator may be removed with the lid 7 if its perforations require cleaning or if the nature of treated material is such that a different stator must be used. The outer side of the stator 12 defines with the internal surface of the housing 4 an annular juice collecting chamber 13 which communicates with the spout 5.

The rotor R comprises a coaxial hub 19 which extends downwardly through a concentric aperture 1a of the carrier 1 surrounded by the collar 3 and is non-rotatably but preferably detachably secured to a drive shaft 14, the latter driven by a non-illustrated electric motor or the like. The upper portion of the hub 19 assumes the form of a turntable which drives two detachable rotor members 15, 16. The lower rotor member 16 assumes the shape of an inverted cup and comprises the aforementioned downwardly extending annular flange which is adjacent to but spaced from the inner side of the stator 12. The upper rotor member 15 is detachably secured to the upper side of the cupped rotor member 16 and its upper side is provided with a plurality of preferably circularly arranged comminuting elements in the form of teeth which, as shown in FIG. 2, may be disposed in radial groups and which serve as means for subjecting the treated materials to a first comminuting action. The central portion of the toothed rotor member 15 is engaged by a spherical antifriction element 7c which is recessed into the lid 7 and extends through a concentric opening of the deflecting plate 9.

The periphery of the cupped rotor member 16 is provided with cutting means in the form of preferably continuous helical ridges or threads 17 whose crests are at least slightly spaced from the inner side of the stator 12. The threads 17 define between themselves helical grooves through which the finely comminuted solid component of the treated material may advance toward and beyond the lower end of the stator 12 and through one or more radial channels 20 of the housing 4 into the chute 2.

The periphery of the cupped rotor member 16 is further provided with at least one but preferably two, three or more groups of additional comminuting elements in the form of circumferentially staggered substantially cam-shaped protuberances 18. Each protuberance 18 preferably comprises a substantially wedge shaped leading and a similarly configurated trailing portion, as seen in the direction in which the rotor R is driven by the shaft 14. As shown in FIG. 1, the circumferentially staggered protuberances 18 of each group need not extend through the full height of the rotor member 16.

The arrangement of protuberances 18 in each group is preferably such that the adjacent protuberances overlap and are angularly displaced through equal distances with respect to each other. The adjacent protuberances 18 in each group preferably define between themselves comparatively shallow passages and they are at least slightly spaced from the inner side of the stator 12 so that the rotor R does not come into actual contact with the stator.

As shown in FIG. 1, the inner side of the stator 12 defines with the externally threaded cupped rotor member 16 an annular comminuting and compressing compartment 13a which communicates with the aperture 9a of the deflecting plate 9 and with the channel or channels 20 of the housing 4. The lowermost portion 21 of the cupped rotor member 16 is preferably smooth, i.e. the lowermost thread 17 is located at a certain distance above the channel or channels 20.

The comminuting apparatus of FIGS. 1 and 2 operates as follows:

The motor of the shaft 14 is started to drive the rotor R at a speed of say 5,000–15,000 r.p.m. and a cooked or raw fruit, vegetable or a like liquid-containing pulpy substance is admitted through the hopper 8 and through the aperture 9a of the deflecting plate 9 into engagement with the rapidly revolving toothed upper side of the rotor member 15. It is now assumed that the treated material consists of raw carrots and that a supply of raw carrots is being continuously introduced through the hopper 8. The teeth of the rotor member 15 subject the carrots to a first comminuting action and the partially comminuted juice-containing carrot particles are advanced by the teeth of the member 15 along the underside of the plate 9 and toward the latter's concave edge portion 10 which deflects the partially comminuted particles into the comminuting compartment 13a at the inner side of the stator 12. Some juice already begins to flow through the perforations of the stator 12 under the action of centrifugal force and is collected in the chamber 13 to be evacuated through the spout 5. The movement of partially comminuted carrot particles toward the deflecting edge portion 10 of the plate 9 is brought about by centrifugal force since it will be noted that the axis of the hopper 8 is eccentric with respect to the rotor axis so that the partially comminuted particles are rapidly led into the comminuting compartment 13a where they are subjected to a further comminuting action brought about by the threads 17 of the cupped rotor member 16. In addition, the partially dehydrated carrot particles are successively engaged by consecutive groups of protuberances 18 and are thereby hurled and pressed with great force and at high speed against the inner side of the stator 12 so that additional juice is being extracted in response to repeated accelerating action of the groupwise arranged protuberances. Such accelerating action of the protuberances 18 upon the by now finely comminuted material is repeated while the material simultaneously advances through the helical grooves between the adjacent threads 17 toward the channel or channels 20 to be ultimately discharged into the chute 2. The wedge shaped leading portions of the protuberances 18 improve their comminuting and compressing action so that a major percentage of the liquid component is extracted from the finely comminuted carrot particles before the particles reach the chute 2. The protuberances are preferably inclined in the same direction as the threads 17 (i.e. they have the same pitch) so that they actually contribute to the action of the threads by advancing the finely comminuted solid component (carrot particles) toward the lower end of the stator 12. Of course, the threads 17 also performs a cutting or comminuting action upon the solid component and are of particular advantage because the protuberances 18 tend to form local accumulations of comminuted carrot particles in the comminuting compartment 13a and such accumulations are immediately dispersed into smaller batches by being compelled to advance through the grooves between the adjacent threads 17.

It will be noted that the treated material, i.e. the partially comminuted particles deflected into the comminuting compartment 13a, is caused to perform a composite movement including a movement in the direction in which the protuberances 18 rotate and a movement substantially at right angles thereto, that is, in the axial direction of the rotor and toward the channel or channels 20. The particles separated from the carrots by the teeth of the rotor member 15 are subjected to at least slight comminuting action while they are forced through the gap between the upper side of the rotor member 15 and the underside of the plate 9 toward the concave edge portion 10, thereupon to an additional comminuting action under the impact of consecutive groups of protuberances 18, and simultaneously to a still further comminuting action of the threads 17. In addition, while advancing through the compartment 13a, the particles are repeatedly accelerated by the groupwise arranged protuberances 18 so that the centrifugal force of extracted liquid component is repeatedly increased which insures that the liquid component penetrates through the perforations of the stator 12 and flows into the chamber 13.

The action of the rotor R may be compared with that of a centrifugal pump and its members 15, 16 generate in the comminuting chamber 13a a substantial pressure whose magnitude depends on the dimensions of this compartment, i.e. on the radial distance between the rotor and the stator and particularly on the cross-sectional area of the compartment 13a at the outer side of the lowermost rotor portion 21. Such pressure also depends on the ratio between the combined area of perforations in the stator 12 and the total area of the stator. The purpose of the smooth lowermost rotor portion 21 is to facilitate exact determination of internal pressures in the comminuting compartment 13a. Thus, the rotor R may be readily replaced by a rotor whose lowermost porton 21 has a different outer diameter so that the cross-sectional area of the compartment 13a adjacent to the outer side of the portion 21 may be increased or reduced, depending on the nature of material which is being treated in my apparatus.

As stated above, the pressure developing in the compartment 13a depends to a considerable extent on the ratio between the combined area of perforations in the stator 12 and the total area of this stator. If this ratio is low (e.g. 1–2 percent), the pressure in the compartment 13a is very high. It was found that the yield of juice and the pressure in compartment 13a will drop considerably if the above ratio is increased to about 8 percent. Very satisfactory results were obtained by utilizing metallic sieve-like stators with a thickness of between 0.2–0.4 mm. and with conical perforations which taper outwardly toward the outer side of the stator. The diameters of the perforations may be in the range of between 0.07–0.3 mm. When the apparatus was utilized as juice extractor in connection with fruits and vegetables, optimum results were obtained with a stator having perforations with a diameter of about 0.25 mm.

It was further found that it is very satisfactory to construct the comminuting apparatus in such a way that the radial width of the comminuting compartment 13a varies between 0.5 and 3 mm., i.e. if the distance between the outermost radial portions of the protuberances and the inner side of the stator 12 is about 0.5 mm. and if the distance between the bottom zones of grooves defined by the threads 17 and the inner side of the stator is about 3 mm. In other words, the maximum radial dimensions of the protuberances may be in the range of 2.5 mm. Of course, the above enumerated specific dimensions are given merely by way of example and are in no way limitative since they depand to a certain extent on the desired output of the apparatus, on the desired degree of extraction, on the speed of the rotor, and on the nature of treated material. For example, higher yields can be achieved if the maximum radial dimensions of the protuberances are further increased with respect to the maximum radial distance between the periphery of the rotor and the inner side of the stator. It will be readily understood that, since the above dimensions were given in connection with a comminuting apparatus which is used as a juice extractor, the situation will be somewhat different if the apparatus is utilized in comminuting of wood, paper or in certain other branches of chemical industry.

It was further found than an apparatus of the type shown in FIGS. 1 and 2 may extract up to 70 percent of liquid component from raw fruits and vegetables, and that the energy requirements of this apparatus are not higher than the energy requirements of conventional rotary extractors of which I am aware at this time. The juice accumulating in the chamber 13 is very clear and the solid component discharged into the chute 2 is drier than the solid component obtainable with known rotary apparatus which are utilized for continuous extraction of juices.

Known apparatus for extraction of juices and/or for separation of liquids from finely comminuted solid materials may be divided in two groups, namely, presses and centrifugal separators. A serious drawback of presses is that they cannot operate continuously and, in addition, their yield is rather low excepting when the operation is carried out at extremely high pressures which require costly equipment.

Centrifugal separators of known design may operate continuously by utilizing hollow, substantially conical perforated rotors into which the comminuted liquid containing material is introduced at a constant or at a variable rate. When the rotor revolves, the liquid is subjected to the action of centrifugal force and penetrates through the perforations. However, the output of such separators is rather low because the centrifugal force remains constant and such separators produce considerable noise when the material is not uniformly distributed in the interior of the rotor. The vibrations which produce the noise also result in rapid wear on the relatively moving parts so that the bearings and seats must be exchanged at frequent intervals which results in high maintenance cost of such apparatus.

It will be noted that the apparatus of my invention fully avoids the drawbacks of known presses and of known centrifugal separators in that it can be operated without interruptions, in that its threads (17 or 17') prevent any local accumulations of comminuted material in the comminuting chamber, in that the extracted liquid is caused to pass through perforations provided in the stator rather than in the rotor of the apparatus, and in that the protuberances repeatedly accelerate the material in the comminuting chamber so that the centrifugal force is caused to fluctuate which results in better liquid extracting action.

FIG. 3 illustrates a modified comminuting apparatus which may be utilized as a mixer. This apparatus comprises a movable comminuting means in the form of a rotor R' whose rotary members 15', 16' are connected to each other by rivets 22 (only one shown) so that they form a unit which is detachably secured to the modified turntable 26 of the hub 19'. Each rivet 22 extends into the interior of the lower rotor member 16' and carries a motion transmitting ring 31 which projects into a complementary recess 23 provided in the upper side of the turntable 26. The latter is integral with an upwardly extending annulus 27 of the hub 19' and its underside is provided with radially outwardly extending open slots 26a (only one shown) each of which may receive a spherical antifriction rolling element 28. The spherical elements 28 also serve as a means for coupling the unit including the rotary members 15', 16' to the turntable 26 when the apparatus is in actual use, i.e. when the rotor R' is driven by the shaft 14'. To that end, the inner side of the downwardly extending annular flange 16a' of the rotor member 16' is formed with comparatively shallow concave depressions or seats 29 each of which may receive a portion of the respective spherical element 28. When the rotor R' is driven, the spherical elements 28 are urged into the depressions 29 by centrifugal force and thereby couple the flange 16a' to the turntable 26. For example, the turntable 26 may be provided with three uniformly spaced slots 26a and the flange 16a' is then provided with an equal number of internal depressions 29. Alternately, the individual concave depressions 29 may be replaced by a single annular depression which then extends all the way about the turntable 26. The arrangement is preferably such that the spherical elements 28 are retained in the respective slots 26a even if the unit including the members 15', 16' is lifted off the turntable 26. This insures that the elements 28 cannot become lost when an operator desires to exchange the unit 15', 16' or to temporarily remove this unit so as to facilitate cleaning of the apparatus. It is sufficient if the walls of the slots 26a are configurated in a way to retain the elements 28 or, alternately, a suitable retaining ring may be provided to prevent the elements 28 from moving entirely out of the respective slots. Of course, the slots allow the elements 28 to move radially outwardly into the depression or depressions 29.

The somewhat modified housing 4' of the apparatus shown in FIG. 3 may be secured to the carrier 1' by a bayonet lock or in another suitable way which renders it possible to radially dismantle the apparatus. As shown, the carrier 1' is provided with a centering shoulder 30 which surrounds the collar 3' and which insures that the housing 4' is properly mounted on the carrier when the apparatus is in actual use.

When the shaft 14' is driven, the radial walls bounding the recesses 23 in the upper side of the turntable 26 entrain the rings 31 and the latter transmit rotary motion to the unit consisting of rotor members 15', 16'. At the same time, the spherical elements 28 are caused by centrifugal force to move radially outwardly into the respective depressions 29 and thereby prevent axial movements of the unit 15', 16' upwardly and away from the turntable 26. It is preferred to configurate the slots 26a in such a way that the elements 28 automatically return into their respective slots 26a as soon as the rotor R' is arrested so that these elements automatically release the unit 15', 16' and enable an operator to conveniently lift this unit above and away from the turntable as soon as the housing 4' is disengaged from the carrier 1'. While FIG. 3 shows that the elements 28 rest on the collar 3', the friction may be reduced still further if the elements 28 are mounted in such a way that they cannot come into contact with the collar 3', at least when the rotor R' is in motion.

The housing 4' is releasably connected with the lid 7' by several bolts and nuts 7a'. It will be noted that the deflecting plate 9 has been omitted in FIG. 3 and that the underside of the lid 7' is provided with an annular concave edge portion 10' which deflects the comminuted particles or a liquid substance into the comminuting and mixing compartment 13a'. The perforated stator 12 of FIGS. 1 and 2 is replaced by a solid non-permeable cylindrical stator 12' which completely seals the chamber 13' from the compartment 13a' since the apparatus of FIG. 3 is assumed to be used as a mixer in that a single substance or a mixture of two or more substances introduced through the spout 8' is thoroughly intermixed and further comminuted in the compartment 13a' before being discharged through the channel or channels 20' and into the chute 2'.

It will be noted that the upper end portion of the drive shaft 14 or 14' is externally threaded so that it may be separated from the internally threaded hub 19 or 19'. This is of considerable advantage because the comminuting apparatus may be detachably connected with the output shaft of another appliance as long as the tapped bore of the hub 19 or 19' is dimensioned in such a way that it may be non-rotatably connected with the output shaft. Alternately, it is equally possible to provide a clutch at the lower end of the drive shaft 14 or 14' in which event the drive shaft and the hub 19 or 19' may form an inseparable unit. The detachability of the unit including the rotor members 15', 16' in a manner as described in connection with FIG. 3 is of particular advantage when the apparatus is utilized as a household appliance because a housewife often lacks the necessary skill as well as the equipment for unscrewing the drive shaft from the hub and/or for removing the lid in order to gain access to the rotor. In the embodiment of FIG. 3, the housing 4' need not be separated from the lid 7' at all, and the assembly including the parts 4', 7' is readily and rapidly detachable from the carrier 1' owing to the provision of the aforementioned bayonet lock or of a similar readily separable coupling device.

It is assumed that the apparatus of FIG. 3 is utilized for the production of certain types of soups known as puree, for the production of baby foods, mush, fruit compotes, and the like. The starting material, e.g. raw apples, is introduced through the hopper 8' and is partially comminuted by the teeth provided at the upper side of the rotor member 15'. The partially comminuted particles are hurled radially outwardly against the deflecting edge portion 10' which guides the particles into the comminuting compartment 13a' where the particles are subjected to further comminuting action performed by the threads 17' and by the protuberances (not shown in FIG. 3) so that they are finely comminuted and are thoroughly intermixed with the extracted apple juice. The resulting mush descends along the inner side of the unperforated stator 12' and is discharged through the channel or channels 20' into the chute 2'. In contrast to known apparatus presently utilized in the production of puree, mush and similar thick-flowing substances, the apparatus of FIG. 3 may transform fruits, vegetables and the like materials into a highly homogenized product without it being necessary that the starting materials be mixed with water or another liquid medium. It will be seen that the improved comminuting apparatus may be used as a very satisfactory substitute for conventional comminuting apparatus and mixers which utilize rotary knives and which will operate satisfactorily only if the starting material is mixed with a liquid before the comminuting operation begins.

The apparatus of FIG. 3 is equally useful as a coffee grinder. In such instances, the diameter of the rotor R' is preferably small and the teeth at the upper side of the rotor member 15' may be replaced by other types of grinding or comminuting elements. Also, if the apparatus is used as a coffee grinder, the underside of the lid 7' may be provided with suitable projections which cooperate with the grinding elements at the upper side of the rotor member 15' to rapidly comminute the beans. The fineness of the grind depends on the nature of grinding elements provides on the lid 7' and/or on the rotor member 15', as well as on the width of the comminuting compartment 13a' and on the width of the gap through which the comminuted coffee particles must pass from the compartment 13a' to the channel or channels 20'. When the apparatus of my invention is used for grinding of coffee beans, of pepper or of like freely flowing comparatively hard substances, the hopper 8' is preferably located in the central portion of the lid 7'.

For example, the comminuting apparatus may be used as a universal household appliance and is then furnished with two or more attachments including a first attachment comprising the parts 4, 7, 9, 12 of FIG. 1, a second attachment comprising the parts 4', 7', 12' and the rotor members 15', 16' of FIG. 3, a third attachment with a smaller housing and with a smaller rotor for use in grinding of coffee, and so on. Also, it is preferred to utilize a variable-speed motor or to utilize a variable-speed transmission for driving the shaft 14 or 14'. In its simplest and hence cheapest form, the comminuting apparatus may be furnished in the form as shown in FIG. 1 or in FIG. 3 and with one or more spare stators one of which may be formed with perforations and the other of which is not permeable to liquid so that the apparatus may be used as an extractor and homogenizer or as a mixer, depending on which of the stators is momentarily mounted in the housing or in the lid.

Finally, the apparatus of my invention (e.g. in the form as shown in FIGS. 1 and 2) may be used as a homogenizer for milk, cheese, eggs and similar products. In such instances, the starting material (e.g. milk) is fed through the valve-controlled outlet 32 of a container 33 which may be placed onto the hopper 8 so as to make sure that the material is not admitted at a rate higher than the rate at which the homogenized product passes through the perforations of the stator 12. Means may be provided for temporarily sealing the channel or channels 20 so that all the material is compelled to pass through the perforated stator. The threads 17 and the protuberances 18 break up the fat globules in the milk and disperse them uniformly in the liquid which then passes through the perforations of the stator.

In the embodiment of FIGS. 1 and 2, the stator 12 may assume the form of a perforated cylindrical sieve or of a liquid-permeable filter whose pores are selected in such way that they will permit penetration of liquid into the collecting chamber 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be protected by Letters Patent is:

1. Apparatus for finely comminuting substances comprising, in combination, a stator including stationary annular sieve means; a rotor coaxially received within said stator, said rotor having a toothed upper surface and having a peripheral surface facing said sieve means and defining therewith an annular comminuting compartment for receiving the substances partly comminuted by said toothed upper surface, said rotor being formed at said peripheral surface with a continuous screw thread forming a helical cutting edge directed toward said sieve means for further comminuting said substances and for feeding the same in axial direction of said rotor, and a plurality of narrow, elongated wedge-shaped projections projecting from said threads in such a manner that the free ends of said projections are spaced closer to said sieve means than said cutting edge, said projections being spaced from each other in circumferential direction and projections at adjacent threads being staggered with respect to each other; and means connected to said rotor for rotating the same at high speed about its axis.

2. Apparatus for finely comminuting substances comprising, in combination, a stator including stationary annular sieve means; a rotor coaxially received within said stator, said rotor having a toothed upper surface and having a peripheral surface facing said sieve means and defining therewith an annular comminuting compartment for receiving the substances partly comminuted by said toothed upper surface, said rotor being formed at said peripheral surface with a continuous screw thread forming a helical cutting edge directed toward said sieve means for further comminuting said substances and for feeding the same in axial direction of said rotor, and a plurality of narrow, elongated wedge-shaped projections projecting from said threads in such a manner that the free ends of said projections are spaced closer to said sieve means than said cutting edge, said projections being spaced from each other in circumferential direction and projections at adjacent threads being arranged along helixes having a pitch considerably greater than that of said screw threads and means connected to said rotor for rotating the same at high speed about its axis.

3. Apparatus for finely comminuting substances comprising, in combination, a stator including stationary annular sieve means; a rotor coaxially received within said stator, said rotor having a toothed upper surface and having a peripheral surface facing said sieve means and defining therewith an annular comminuting compartment for receiving the substances partly comminuted by said toothed upper surface being formed at said peripheral surface with a continuous screw thread forming a helical cutting edge directed toward said sieve means for further comminuting said substances and for feeding the same in axial direction of said rotor, and a plurality of narrow, elongated wedge-shaped projections projecting from said threads in such a manner that the free ends of said projections are spaced closer to said sieve means than said cutting edge, said projections being spaced from each other in circumferential direction and projections at adjacent threads being staggered with respect to each other, said threads and projections being spaced from said sieve means in such a manner that the radial width of said comminuting compartment varies between 0.5 and 3.0 mm. and means connected to said rotor for rotating the same at high speed about its axis.

4. Apparatus for finely comminuting substances comprising, in combination, a stator including stationary annular sieve means, said sieve means being formed with perforations having diameters ranging between 0.07 and 0.3 mm. and the ratio between the combined area of said perforations and the total area of said sieve means being in the order of 1–2%; a rotor coaxially received within said stator, said rotor having a toothed upper surface and having a peripheral surface facing said sieve means and defining therewith an annular comminuting compartment for receiving the substances partly comminuted by said toothed upper surface, said rotor being formed at said peripheral surface with a continuous screw thread forming a helical cutting edge directed toward said sieve means for further comminuting said substances and for feeding the same in axial direction of said rotor, and a plurality of narrow, elongated wedge-shaped projections projecting from said threads in such a manner that the free ends of said projections are spaced closer to said sieve means than said cutting edge, said projections being spaced from each other in circumferential direction and projections at adjacent threads being staggered with respect to each other; and means connected to said rotor for rotating the same at high speed about its axis.

5. Apparatus for finely comminuting substances comprising, in combination, a stator including stationary annular sieve means removably connected to said stator; a rotor coaxially received within said stator, said rotor having a toothed upper surface and having a peripheral surface facing said sieve means and defining therewith an annular comminuting compartment for receiving the substances partly comminuted by said toothed upper surface, said rotor being formed at said peripheral surface with a continuous screw thread forming a helical cutting edge directed toward said sieve means for further comminuting said substances and for feeding the same in axial direction of said rotor, and a plurality of narrow, elongated wedge-shaped projections projecting from said threads in such a manner that the free ends of said projections are located closer to said sieve means than said cutting edge, said projections being spaced from each other in circumferential direction and projections at adjacent threads being staggered with respect to each other; said stator adapted to have non-permeable annular surface means interchangeable with said sieve means so that said apparatus may be used with said sieve means for comminuting liquid containing substances for extracting the liquid therefrom and with said non-permeable annular surface means for comminuting and homogenizing substances without extracting liquid therefrom; and means connected to said rotor for rotating the same at high speed about its axis.

References Cited by the Examiner
UNITED STATES PATENTS

| | | | |
|---|---|---|---|
| 1,387,380 | 8/21 | Fryer | 259—7 |
| 1,435,464 | 11/22 | Grindrod | 259—95 |
| 1,445,427 | 2/23 | Werner | 259—96 |
| 2,181,218 | 11/39 | Thompson | 146—225 |
| 2,309,328 | 1/43 | Polk et al. | 146—236 |
| 2,345,779 | 4/44 | Wagner | 146—239 |
| 2,389,862 | 11/45 | McGihon | 146—76 |
| 2,409,497 | 10/46 | Kessel. | |
| 2,435,216 | 2/48 | Hofmann | 259—7 |
| 2,573,585 | 10/51 | McBean. | |
| 2,738,930 | 3/56 | Schneider | 259—8 X |
| 2,840,130 | 6/58 | Schwarz | 146—76 |
| 2,941,561 | 6/60 | Pavia | 146—182 |
| 3,004,573 | 10/61 | Cover | 146—239 |
| 3,065,779 | 11/62 | Matarrese. | |
| 3,100,009 | 8/63 | Drachenberg. | |

J. SPENCER OVERHOLSER, *Primary Examiner.*

ARNOLD RUEGG, *Examiner.*